US010885601B1

(12) United States Patent
Weir et al.

(10) Patent No.: US 10,885,601 B1
(45) Date of Patent: Jan. 5, 2021

(54) FAMILY MANAGEMENT DURING MUSTER

(71) Applicant: Royal Caribbean Cruises Ltd., Miami, FL (US)

(72) Inventors: Nick Weir, Davie, FL (US); Joey Hasty, Miami, FL (US); Josh Nakaya, Glendale, CA (US)

(73) Assignee: Royal Caribbean Cruises Ltd., Miami, FL (US)

( * ) Notice: Subject to any disclaimer, the term of this patent is extended or adjusted under 35 U.S.C. 154(b) by 0 days.

(21) Appl. No.: 16/705,617

(22) Filed: Dec. 6, 2019

(51) Int. Cl.
| | |
|---|---|
| *G06Q 90/00* | (2006.01) |
| *G08B 21/02* | (2006.01) |
| *H04W 4/33* | (2018.01) |
| *H04W 4/024* | (2018.01) |
| *H04W 4/02* | (2018.01) |
| *H04W 4/029* | (2018.01) |
| *G01C 21/20* | (2006.01) |

(52) U.S. Cl.
CPC ......... *G06Q 90/205* (2013.01); *G01C 21/206* (2013.01); *G08B 21/0222* (2013.01); *G08B 21/0258* (2013.01); *G08B 21/0266* (2013.01); *H04W 4/023* (2013.01); *H04W 4/024* (2018.02); *H04W 4/029* (2018.02); *H04W 4/33* (2018.02)

(58) Field of Classification Search
CPC .............. G06Q 90/205; G08B 21/0258; G08B 21/0222; G08B 21/0266; G01C 21/206; H04W 4/33; H04W 4/024; H04W 4/023; H04W 4/029
See application file for complete search history.

(56) References Cited

U.S. PATENT DOCUMENTS

| | | | | |
|---|---|---|---|---|
| 6,801,907 | B1* | 10/2004 | Zagami | G07C 9/253 |
| 9,159,212 | B1* | 10/2015 | Hadsall, Sr. | G08B 21/22 |
| 10,582,335 | B1* | 3/2020 | Weir | G06Q 30/0218 |
| 2002/0055872 | A1* | 5/2002 | LaBrie | G06Q 30/02 |
| | | | | 705/14.37 |
| 2007/0051294 | A1* | 3/2007 | Pike | B63G 8/001 |
| | | | | 114/348 |
| 2010/0282839 | A1* | 11/2010 | Zura | G06Q 10/00 |
| | | | | 235/382 |
| 2011/0109434 | A1* | 5/2011 | Hadsall, Sr. | G08B 21/0275 |
| | | | | 340/8.1 |
| 2013/0300560 | A1* | 11/2013 | Hadsall, Sr. | G08B 26/007 |
| | | | | 340/539.13 |
| 2014/0340220 | A1* | 11/2014 | Meraz | G08B 26/008 |
| | | | | 340/539.13 |

(Continued)

*Primary Examiner* — Russell Frejd
(74) *Attorney, Agent, or Firm* — Steven M. Greenberg, Esq.; Shutts & Bowen LLP

(57) ABSTRACT

Embodiments of the present invention provide a method, system and computer program product for family management during muster on a vessel. In an embodiment of the invention, a method for family management during muster includes associating a mobile device of a child on the vessel with a mobile device of a parent of the child also on the vessel and assigning a muster station on the vessel to the parent and a muster station to the child. For instance, the muster station assigned to the child may be different than that of the parent. Thereafter, during a muster event, a location of the mobile device of the child on the vessel is determined relative to the muster station assigned to the child and a message may be transmitted to the mobile device of the parent indicating the determined location.

11 Claims, 2 Drawing Sheets

(56) References Cited

U.S. PATENT DOCUMENTS

2018/0089785 A1* 3/2018 Imoto .................. G01C 21/206
2019/0339351 A1* 11/2019 Sundia .................. G01S 5/0221
2019/0340560 A1* 11/2019 Sundia ........... G06Q 10/063114

* cited by examiner

FAMILY MANAGEMENT DURING MUSTER

BACKGROUND OF THE INVENTION

Field of the Invention

The present invention relates to the field of muster management in an ocean-going vessel and more particularly to coordinating passenger muster in a cruise ship.

Description of the Related Art

Muster refers to the organized and pre-planned congregation of different passengers on an ocean-going vessel at different locations of the ocean-going vessel in response to, or in preparation for, a response to an emergency condition in the ocean-going vessel. Traditionally, in the context of a passenger cruise ship, a muster drill is performed at the beginning of the cruise before the cruise ship departs or shortly thereafter. During the muster drill, each individual passenger reports to an assigned muster station—a specific location on the vessel. A crew member then confirms the presence of each passenger expected to be present at the specific location during the muster drill so that all passengers may be accounted for in the event of an actual emergency and a resultant actual muster.

The muster process is particularly important because, with different clusters of passengers pre-positioned at specific, predetermined locations, an orderly evacuation of the vessel may be achieved if required, or at least all passengers can be accounted for and the location of the passengers managed relative to a location of an emergency condition aboard the vessel. Prior to an emergency, a muster drill is important as the muster drill introduces to each passenger the precise location at which the passenger is required to report in the event of an actual emergency as well as demonstrates important safety information such as the identification of life jackets and warning signals the guest might hear. Consequently, in light of the prospective frenetic activity of muster during an actual emergency, it is desirable to have confidence that the passengers each will be able to traverse the vessel to the assigned muster station.

Despite the desire for a chaos free muster, the reality remains that during an emergency condition—even a minor emergency—general confusion may arise simply owing to the complexity of size and architecture of a vessel and the mass movement of so many passengers to different locations within a short period of time. Indeed, during a muster event, whether a drill or actual, the resulting process can be confusing for some—particularly the elderly and children—both of whom often require additional assistance locating and moving towards assigned muster stations. The foregoing difficulties may be compounded when the muster event occurs during nighttime when passengers awake from sleep and may not be completely aware of unfamiliar surroundings. Crew members generally are trained to supply such assistance, but lapses remain possible.

BRIEF SUMMARY OF THE INVENTION

Embodiments of the present invention address deficiencies of the art in respect to muster on a vessel and provide a novel and non-obvious method, system and computer program product for family management during muster on a vessel. In an embodiment of the invention, a method for family management during muster includes associating a mobile device of a child on the vessel with a mobile device of a parent of the child also on the vessel and assigning a muster station on the vessel to the parent and a muster station to the child. For instance, the muster station assigned to the child may be different than that of the parent. Thereafter, during a muster event, a location of the mobile device of the child on the vessel is determined relative to the muster station assigned to the child and a message may be transmitted to the mobile device of the parent indicating the determined location. In this way, despite the confusion that may be caused during muster, the parent of a child on the vessel may maintain an awareness of the progress of muster for the child.

In one aspect of the embodiment, an estimated time of arrival of the child is computed for the child to reach the muster station assigned to the child and the estimated time of arrival is included in the message. Conversely, an estimated time of arrival of the parent is computed for the parent to reach the muster station assigned to the parent and a different message may be additionally transmitted to the mobile device of the child including the computed estimated time of arrival of the parent. In another embodiment of the invention, the method further includes responding to a determination that the location of the mobile device of the child on the vessel is proximate to a location of the muster station assigned to the parent by re-assigning the muster station of the child to the muster station of the parent. Conversely, the method further includes responding to a determination that the location of the mobile device of the parent on the vessel is proximate to a location of the muster station assigned to the child by re-assigning the muster station of the parent to the muster station of the child.

In another embodiment of the invention, a data processing system is disposed on a vessel and adapted for family management during muster. The system includes a host computing platform having one or more computers, each with memory and at least one processor, a multiplicity of wireless access points positioned on a vessel and coupled to the host computing platform and passenger location logic executing in the memory of the host computing platform and receiving location data from the wireless access points for different mobile computing devices present on the vessel and associated with respectively different passengers on the vessel. The system also includes a family management muster routing module that includes computer program instructions configured for execution in the host computing platform. The instructions associate one of the different mobile computing devices of a child on the vessel with one of the different mobile computing devices of a parent of the child also on the vessel, assign a muster station on the vessel to the parent and a muster station to the child and, during a muster event, determine from the location data a location of the one of the different mobile computing devices of the child on the vessel relative to the muster station assigned to the child and transmit a message to the one of the different mobile computing devices of the parent indicating the determined location.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for family management during muster on a vessel. In accordance with an embodiment of the invention, each of a parent and a child are separately assigned to a muster station which may be the same muster station, or a different muster station. During muster, a location of the child in respect to the assigned muster station may be determined, for instance by tracking a location of a mobile device of the child on the vessel or a trackable wearable worn by the child on the vessel. Examples of trackable wearables include a smart watch, a smart bracelet or a smart pendant, each including a processor, memory, a display and network communications circuitry along with a strap, band, hook, ring or neckless adapted for securing to the body of or an article of clothing of the child. The location is then provided to a mobile device of the parent. Optionally, an estimated time of arrival of the child at the assigned muster station may be provided in the mobile device of the parent. As well, to the extent that it is determined that the child has arrived at the muster station assigned to the parent instead of the muster station assigned to the child, the muster station assigned to the parent is re-assigned to the child so as to not create a false expectation that the child will arrive at the formerly assigned muster station. In this way, the confusion that often results during an actual muster event as between parents and children separately performing muster may be alleviated.

Figure 1:
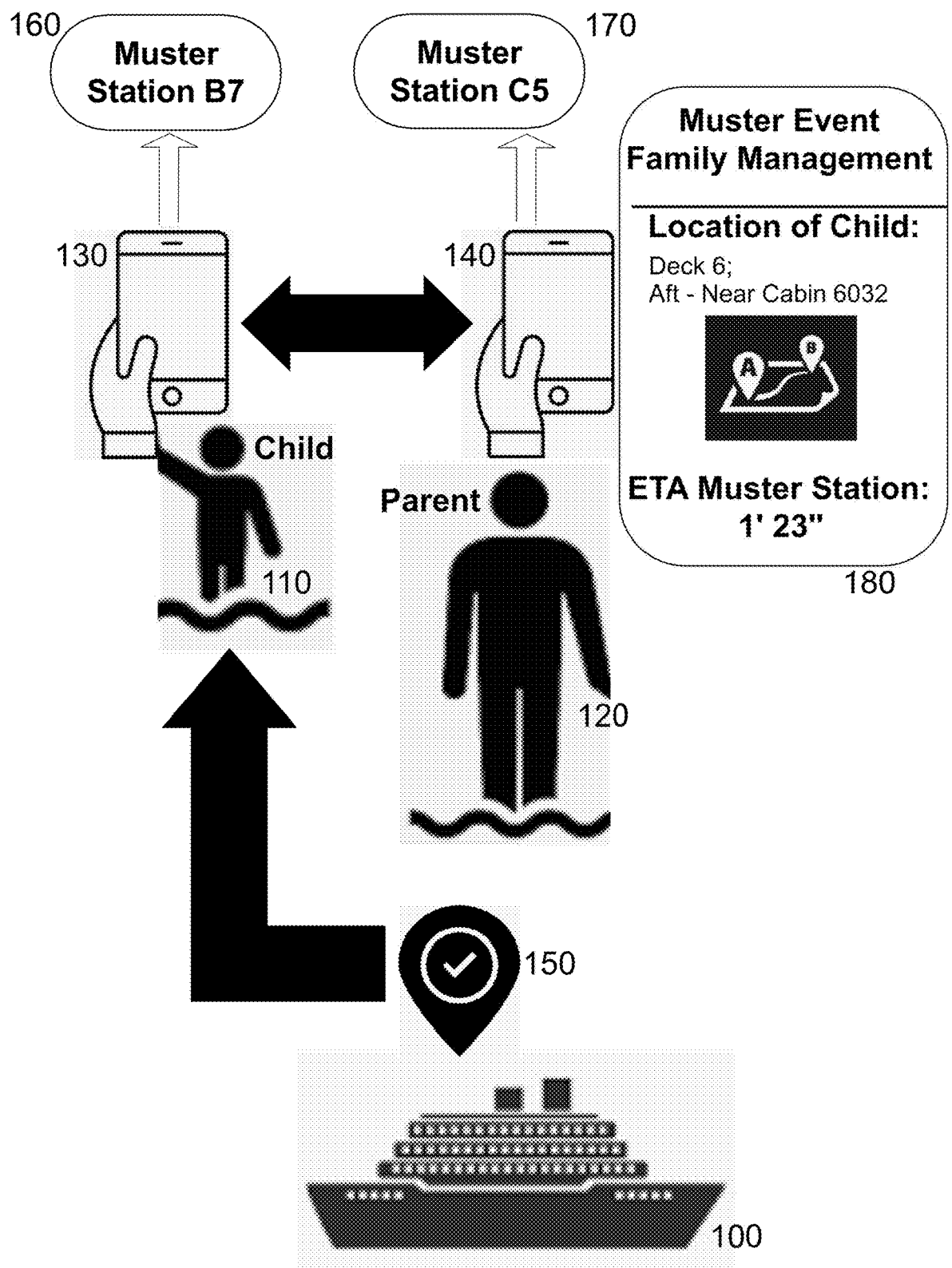
FIG. 1 is a pictorial illustration of a process for family management during muster on a vessel.

In further illustration, FIG. 1 pictorially shows a process for family management during muster on a vessel. As shown in FIG. 1, both a child 110 and a parent 120 of the child 110 on board a vessel 100 are assigned respective muster stations 160, 170 on the vessel 100—either different muster stations, or the same muster station. As well, the parent 120 and child 110 are registered in association with one another on the vessel 100, and a mobile device 130 of the child 110, and a mobile device 140 of the parent 120 are registered as being associated with the child 110 and parent 120, respectively. Thereafter, during a muster event such as an actual muster, or a mere muster drill, a location 150 of the mobile device 130 of the child 110 is determined on the vessel 100 and a path computed as between the mobile device 130 and the muster station 160. As well, an estimated time of arrival of the child 110 at the muster station 160 is computed based upon the determined location 150. Finally, a display 180 is presented in the mobile device 140 of the parent 120 including both the determined location 150 and the computed estimated time of arrival.

Figure 2:
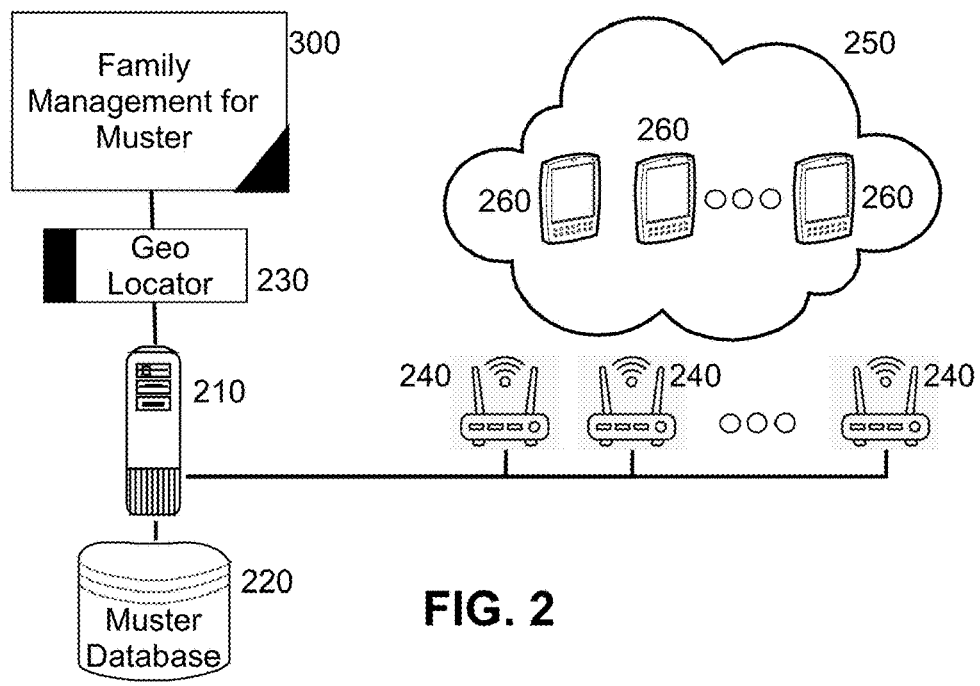
FIG. 2 is a schematic illustration of a data processing system disposed on a vessel and configured for family management during muster; and, FIG. 3 is a flow chart illustrating a process for family management during muster on a vessel.

The process described in connection with FIG. 1 can be implemented in a data processing system. In further illustration, FIG. 2 schematically shows a data processing system disposed on a vessel and configured for family management during muster. The system includes a host computing system 210 that includes one or more computers, each with memory and at least one processor. The host computing system 210 is communicatively coupled to an array of wireless access points 240 each providing a wireless computer communications network 250 in which one or more mobile computing devices 260 can communicate with the host computing system 210. The host computing system further includes a geo-locator 230 adapted to locate each one of the mobile computing devices 260 based upon an association with a respective one of the wireless access points 240. Finally, the system includes a family management module 300 communicatively coupled to the geo-locator 230 and including computer program instructions executing in the host computing platform 210.

The computer program instructions during execution register in the muster database 220 a child in association with a parent onboard the vessel, and also register in the muster database 220 respective ones of the mobile computing devices in association with each of the parent and child. The program instructions yet further register in the muster database 220 a muster station in connection with the parent, and also a muster station in connection with the child. Then, during a muster event, a location of the one of the mobile computing devices 260 of the child is determined in respect to a known location of one of the wireless access points 240 to which the one of the mobile computing devices 260 is associated based upon a query to the geo-locator 230. As well, the program instructions compute an estimated time of arrival at the assigned one of the muster stations based upon the determined location. Finally, the program instructions transmit the determined location and the estimated time of arrival to the one of the mobile devices 260 of the parent of the child.

Optionally, the program instructions compute a location of the one of the mobile computing devices 260 of the parent by query to the geo-locator 230, and also an estimated time of arrival of the parent at an assigned one of the muster stations recorded in the muster database 220 for the parent. Consequently, the program instructions transmit the determined location of the parent and the computed estimated time of arrival of the parent at the correspondingly assigned one of the muster stations to the one of the mobile computing devices 260 of the child. Finally, in so far as the one of the muster stations assigned to the child differs from that of the parent, and a location of the one of the mobile computing devices 260 of the child is determined to be proximate to the muster station assigned to the parent, the program instructions re-assign the muster station of the parent to the child in the muster database 220. Conversely, in so far as the one of the muster stations assigned to the child differs from that of the parent, and a location of the one of the mobile computing devices 260 of the parent is determined to be proximate to the muster station assigned to the child, the program instructions re-assign the muster station of the child to the parent in the muster database 220.

Figure 3:
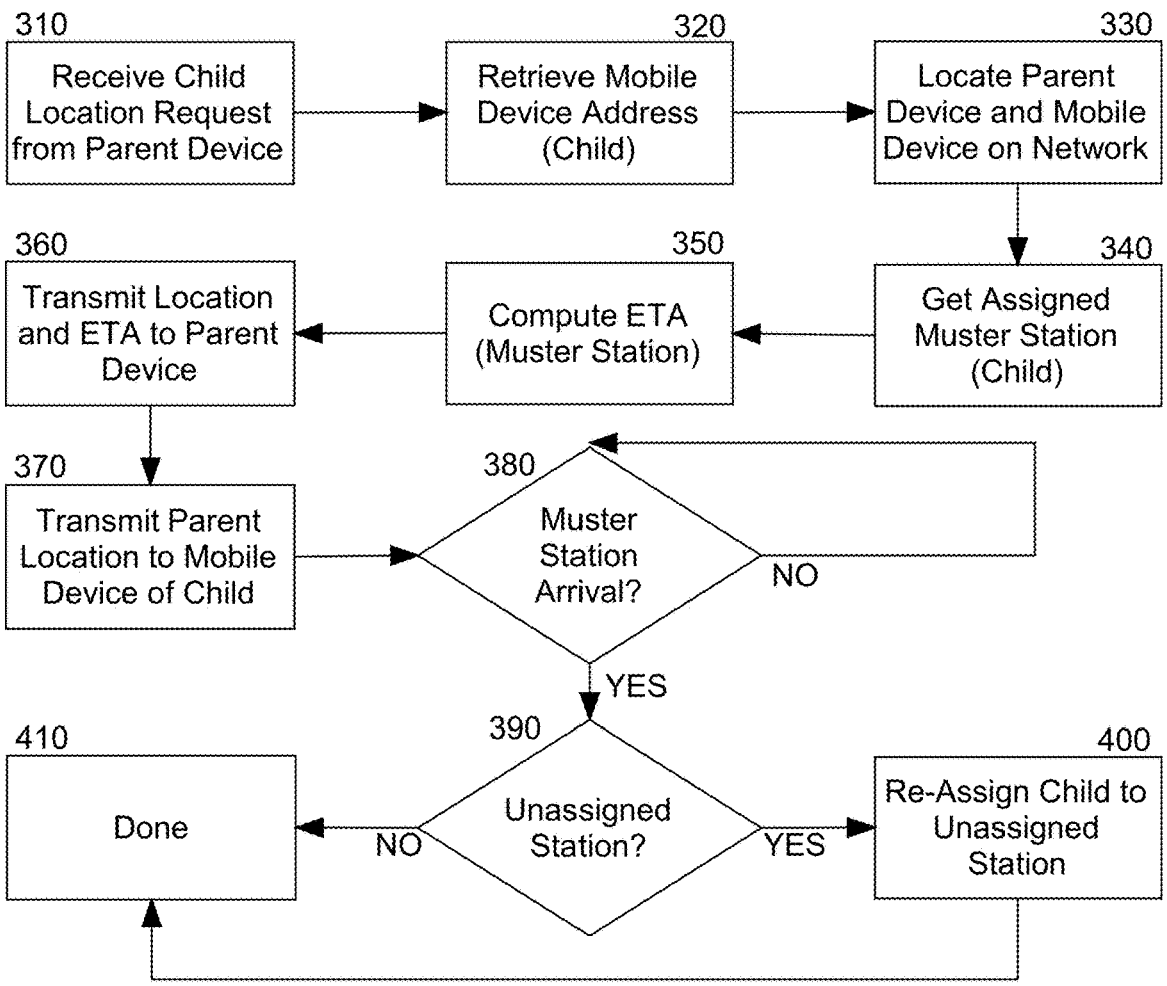

In yet further illustration of the operation of the family management module 300, FIG. 3 is a flow chart illustrating a process for family management during muster on a vessel. Beginning in block 310, a location request is received for a child onboard the vessel from a mobile computing device of a parent of the child. In block 320, a network addressable address of a mobile computing device of the child is determined from a table of mobile devices of passengers onboard the vessel. In block 330, the mobile computing device of the child and also a mobile computing device of the parent, are is located on the vessel. As well, a muster station on the vessel assigned to the child is retrieved from memory and in block 350, an estimated time of arrival of the child at the assigned muster station is computed based upon the location of the mobile computing device of the child.

Thereafter, both the location of the mobile computing device of the child and also the estimated time of arrival are transmitted to the mobile computing device of the parent in block 360. Optionally, the location of the mobile computing device of the parent is transmitted to the mobile computing device of the child in block 370. Then, in decision block 380, it is determined if the child has arrived at a muster station. If so, in decision block 390 it is further determined if the muster station at which the child has arrived is the muster station assigned to the child. If not, in block 400 the muster station at which the child has arrived is re-assigned to the child and in block 410, the process ends.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A family management method during muster on a vessel, the method comprising:
   associating a mobile device of a child on the vessel with a mobile device of a parent of the child also on the vessel;

assigning a muster station on the vessel to the parent and a different muster station to the child; and, during a muster event occurring on the vessel, determining a first location of the mobile device of the child on the vessel relative to the muster station assigned to the child, determining a second location of the mobile device of the parent on the vessel relative to the muster station assigned to the parent, computing an estimated time of arrival of the child at the muster station assigned to the child, computing an estimated time of arrival of the parent at the muster station assigned to the parent, and transmitting a message to the mobile device of the parent indicating the first determined location and the estimated time of arrival of the child at the muster station assigned to the child, while also transmitting a different message to the mobile device of the child indicating the estimated time of arrival of the parent.

2. The method of claim 1, further comprising responding to a determination that the location of the mobile device of the child on the vessel is proximate to a location of the muster station assigned to the parent by re-assigning the muster station of the child to the muster station of the parent.

3. The method of claim 1, further comprising responding to a determination that the location of the mobile device of the parent on the vessel is proximate to a location of the muster station assigned to the child by re-assigning the muster station of the parent to the muster station of the child.

4. The method of claim 1, wherein the mobile device is a trackable wearable.

5. A data processing system disposed on a vessel and adapted for family management during muster, the system comprising:

a host computing platform comprising one or more computers, each with memory and at least one processor;

a multiplicity of wireless access points positioned on a vessel and coupled to the host computing platform;

passenger location logic executing in the memory of the host computing platform and receiving location data from the wireless access points for different mobile computing devices present on the vessel and associated with respectively different passengers on the vessel; and, a family management muster routing module comprising computer program instructions configured for execution in the host computing platform, the instructions performing:

associating one of the different mobile computing devices of a child on the vessel with one of the different mobile computing devices of a parent of the child also on the vessel;

assigning a muster station on the vessel to the parent and a different muster station to the child; and, during a muster event occurring on the vessel, determining a first location of the mobile device of the child on the vessel relative to the muster station assigned to the child, determining a second location of the mobile device of the parent on the vessel relative to the muster station assigned to the parent, computing an estimated time of arrival of the child at the muster station assigned to the child, computing an estimated time of arrival of the parent at the muster station assigned to the parent, and transmitting a message to the mobile device of the parent indicating the first determined location and the estimated time of arrival of the child at the muster station assigned to the child, while also transmitting a different message to the mobile device of the child indicating the estimated time of arrival of the parent.

6. The system of claim 5, wherein the instructions further perform responding to a determination from the location that the location of the one of the different mobile computing devices of the child on the vessel is proximate to a location of the muster station assigned to the parent by re-assigning the muster station of the child to the muster station of the parent.

7. The system of claim 5, wherein the instructions further perform responding to a determination from the location data that the location of the one of the different mobile computing devices of the parent on the vessel is proximate to a location of the muster station assigned to the child by re-assigning the muster station of the parent to the muster station of the child.

8. The system of claim 5, wherein the one of the different mobile computing devices of the child is a trackable wearable.

9. A computer program product for family management during muster on a vessel, the computer program product including a non-transitory computer readable storage medium having program instructions embodied therewith, the program instructions executable by a device to cause the device to perform a method including:

associating a mobile device of a child on the vessel with a mobile device of a parent of the child also on the vessel;

assigning a muster station on the vessel to the parent and a different muster station to the child; and, during a muster event occurring on the vessel, determining a first location of the mobile device of the child on the vessel relative to the muster station assigned to the child, determining a second location of the mobile device of the parent on the vessel relative to the muster station assigned to the parent, computing an estimated time of arrival of the child at the muster station assigned to the child, computing an estimated time of arrival of the parent at the muster station assigned to the parent, and transmitting a message to the mobile device of the parent indicating the first determined location and the estimated time of arrival of the child at the muster station assigned to the child, while also transmitting a different message to the mobile device of the child indicating the estimated time of arrival of the parent.

10. The computer program product of claim 9, wherein the method further includes responding to a determination that the location of the mobile device of the child on the vessel is proximate to a location of the muster station assigned to the parent by re-assigning the muster station of the child to the muster station of the parent.

11. The computer program product of claim 9, wherein the method further includes responding to a determination that the location of the mobile device of the parent on the vessel is proximate to a location of the muster station assigned to the child by re-assigning the muster station of the parent to the muster station of the child.

* * * * *